Oct. 20, 1970   E. H. YONKERS   3,534,989
END FITTING

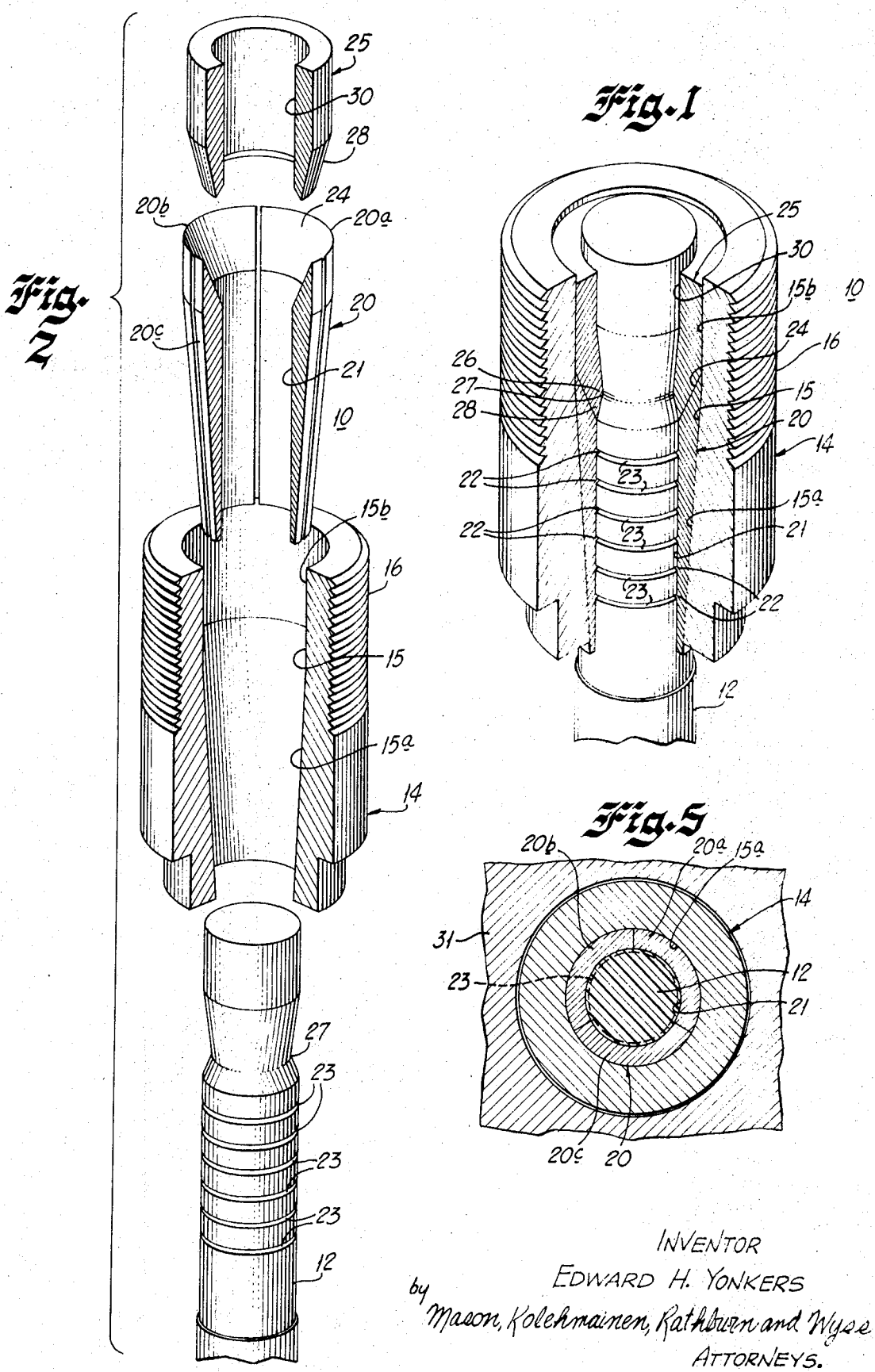

Filed May 29, 1968   2 Sheets-Sheet 2

INVENTOR
EDWARD H. YONKERS
by
Mason, Kolehmainen, Rathburn and Wyss
ATTORNEYS.

United States Patent Office 3,534,989
Patented Oct. 20, 1970

3,534,989
END FITTING
Edward H. Yonkers, Glencoe, Ill., assignor to Joslyn Mfg. and Supply Co., Chicago, Ill., a corporation of Illinois
Filed May 29, 1968, Ser. No. 733,131
Int. Cl. F16b 2/00
U.S. Cl. 287—20.3      5 Claims

ABSTRACT OF THE DISCLOSURE

There is provided an end fitting for a rod, such as a rod of glass fibers. The end fitting includes an outer jacket having a cavity tapering toward one end, and a longitudinally split wedge-shaped collet assembly for conforming gripping engagement with the outer surface of a rod. A lock ring is provided outwardly of the collet assembly for gripping engagement with the outer surface of a rod end effective to maintain the collet assembly tight whenever the rod is tensioned.

---

The present invention relates to an end fitting, and particularly to an end fitting for a rod of molded glass fibers such as would be used in power transmission applications.

Glass fiber rods are useful for strain rods and like applications in power transmission uses. Such glass fiber rods are presently available with high tensile strength. A tensile strength of 70,000 pound for a 13/16 inch diameter rod is now commercially available. Such high tension loadings of glass fiber rods requires an improved end fitting to adequately grip the rod and to insure that the rod does not pull loose of the fitting.

Accordingly it is an object of the present invention to provide a new and improved end fitting for a rod.

Another object of the present invention is to provide a new and improved end fitting for a glass fiber rod for power transmission applications.

Yet a further object of the present invention is the provision of a new and improved end fitting for a glass fiber rod.

Further objects and advantages of the present invention will become apparent as the following description proceeds and the features of novelty which characterize the invention will be pointed out with particularity in the claims annexed to and forming a part of this specification.

In accordance with these and other objects, there is provided an improved end fitting for a rod, particularly suited for use with a glass fiber rod, including an outer jacket having a cavity formed with a portion tapered toward one end. A longitudinally split wedge-shaped collet assembly defining a plurality of wedge fingers is seated within the tapered portion of the jacket and defines a central bore gripping the outer surface of a rod end. The bore has a wedge surface tapered outwardly opening toward the other end of the jacket opening. A lock ring is provided with a central bore in gripping engagement with the outer surface of the rod end outwardly of the collet assembly, and having a wedge surface in interfacial engagement with the wedge surface of the collet assembly. Thus the lock ring is effective to apply a wedging load on the collet assembly whenever the rod is under tensile load. Moreover advantageously there is no possibility of releasing the rod end if the rod tension is released or if the rod is loosened.

In accordance with a particular feature of the present invention, it has been found that a collet assembly and lock ring formed of zinc alloy is particularly adapted for gripping engagement of a molded glass fiber rod. Advantageously a coating on the inner surface of the jacket cavity of a layer of zinc alloy further facilitates the locking of the collet assembly in the end fitting.

For a better understanding of the present invention, reference may be had to the accompanying drawings wherein:

FIG. 1 is a cross sectional perspective view of the end fitting according to the present invention;

FIG. 2 is a cross sectional exploded perspective view of the end fitting of FIG. 1;

FIG. 5 is a cross sectional view of the end fitting of FIG. 4, taken along line 5—5 thereof.

Figure 3:
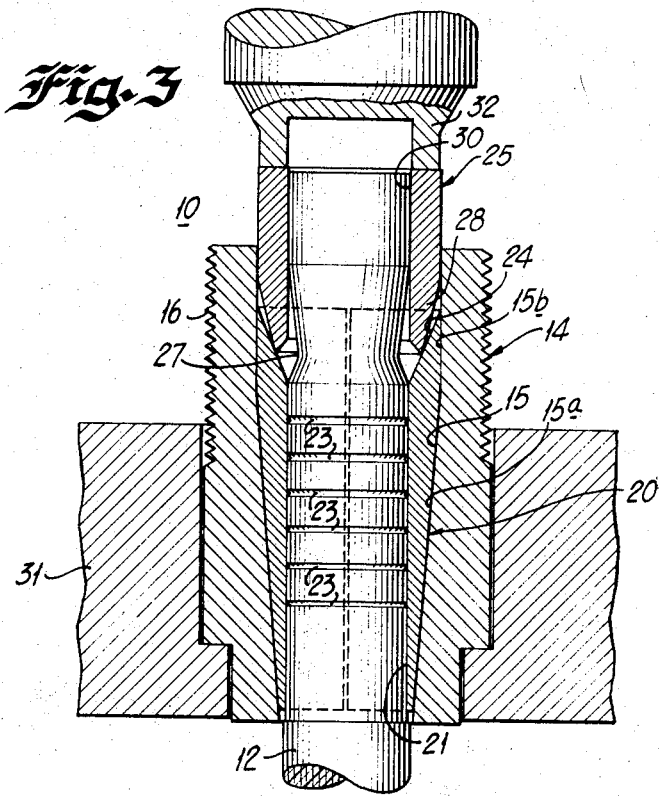
FIG. 3 is a cross sectional view of the end fitting of FIG. 1, illustrated prior to final assembly.

Referring now to the drawings, there is illustrated an end fitting assembly 10 for the end of a rod 12 which may conveniently be formed of axially aligned glass fibres bonded together under tension by means of an in situ polymer such as epoxy or polyester. The end fitting assembly 10 includes an outer jacket 14 of somewhat cylindrical shape and having an inner cavity 15 including a portion 15a tapered toward one end from a substantially cylindrical portion 15b. The outer surface of the outer jacket 14 may have any desired configuration, but conveniently may include external threads 16 to receive a conventional nut. In the illustrated embodiment, the inner surface of both the tapered and cylindrical portions 15a and 15b of the inner cavity 15 is provided with a slip coating 17 such as of molybdenum sulfide of graphite, FIG. 6.

For gripping the end of the rod 12, there is provided a longitudinally split wedge-shaped collet assembly 20 of suitable material having required plastic deformation characteristics and a thermal expansion coefficient which is close to that of the particular glass fibres—plastic rod complex with which it is joined. Zinc alloy has been found to possess these characteristics. The collet assembly 20 is formed of three wedge fingers 20a, 20b, and 20c, FIG. 2. The collet assembly 20 is wedged within the tapered portion 15a of the cavity 15 and is provided with a central bore 21 for gripping engagement with the outer surface of the rod end 12. If desired, the central bore 21 may be provided with one or more inwardly projecting rings or portions 22, FIG. 6 for locking the collet assembly to the rod end. Under these conditions it may be desirable to prepare the end of the rod 12 by providing circumferential cut recesses 23 complementary to the projections 22. The upper or outer end of the central bore 21 in the collet assembly 20 is provided with a wedge or cam surface 24 tapering outwardly.

Figure 4:
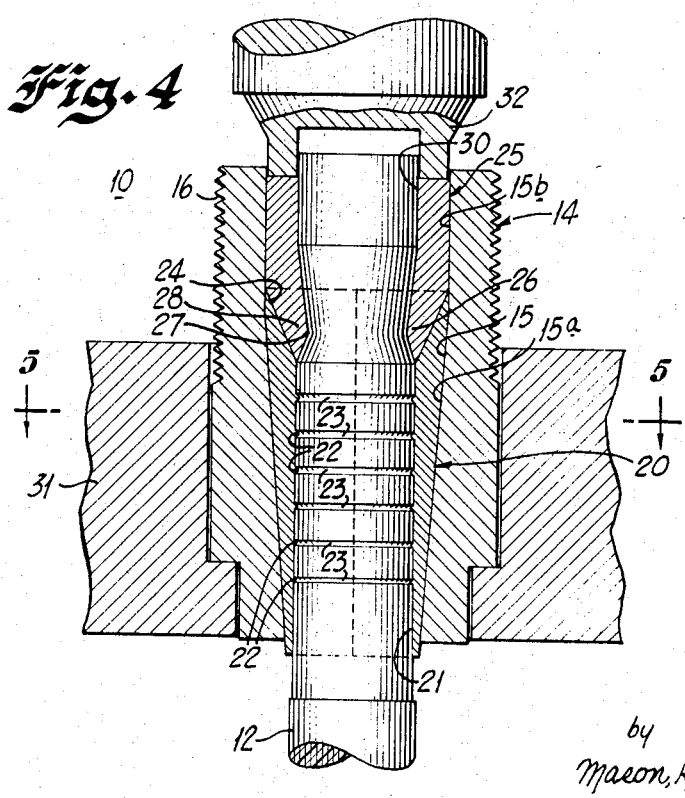
FIG. 4 is a cross sectional view of the end fitting of FIG. 3, illustrated fully assembled.
Figure 6:
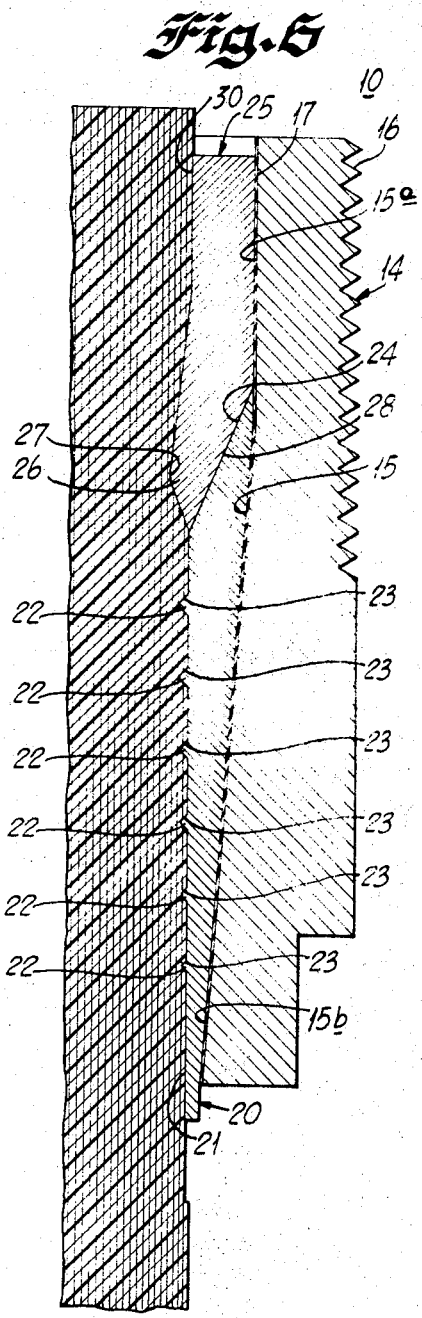
FIG. 6 is an enlarged detail view illustrating the interfacial engagement between the collet assembly and the locking ring.

To prevent loosening of the collet assembly 20 should tension on the rod 12 be released or relaxed, there is provided a lock ring 25 of suitable material such as zinc alloy secured to the outer end of the rod 12. Specifically, as best illustrated in FIGS. 1, 4 and 6, the lock ring 25 has an inner surface initially cylindrical but forced inward by axial pressure against cam surface 24 to provide an inwardly projecting portion 26 fitting around and locked into a circumferential depression 27 formed near the one end of the rod 12. The lock ring 25 is provided with a wedge or cam surface 28 in interfacial engagement with the cam surface 24 of the collet assembly 20. Thus since the lock ring 25 is securely locked to the end of the rod 12 by the inwardly projecting portion 26 secured around the depression 27 of the rod end, any tension on the rod 12 tends to wedge the collet assembly 20 tightly into the cavity 15. The zinc alloy lock ring is readily forced into conforming gripping engagement with its mating members.

One method of assembling the end fitting assembly 10 to the end of the rod 12 is illustrated in FIGS. 3 and 4. Preferably the rod end is first prepared by forming the recesses 23 and depression 27, by machining or other suitable means, to provide a rod end as illustrated in FIG. 2. The rod end is then inserted through the cavity 15, the collet assembly 20 inserted over the rod end with the projections 22 thereof extending into the recesses 23, and the collet assembly fitted into the tapered portion 15a of the inner cavity 15 as illustrated in FIG. 3. The lock ring 25 is preferably formed of a somewhat cylindrical shape, with a substantially cylindrical center bore 30, FIG. 3, and having the cam surface 28 tapering less than the cam surface 24 of the collet assembly 20. The entire end fitting assembly 10 may be suitably supported in a fixture 31. The lock ring 25 may then be driven down over the end of the rod 12 by a suitable tool 32 so as to deform the lower edge of the lock ring, bringing the inwardly projecting portion 26 into the depression 27 and driving the cam surface 28 thereof into interfacial engagement with the cam surface 24 of the collet.

Advantageously an end fitting assembly according to the present invention is securely fastened to the rod 12. The end fitting assembly 10 will carry and transmit the extremely high tensile loadings to which a glass fiber rod may be subjected. There is no possibility of the collet assembly 20 dropping loose of the cavity 15, nor of the rod 12 sliding within the collet assembly 20 without gripping engagement therewith since the lock ring 25 will wedge the collet assembly 20 tightly into gripping engagement with the rod end at any time that tensile load is reapplied to the rod 12.

Although the present invention has been described by reference to only a single embodiment thereof, it will be apparent that numerous other modifications and embodiments may be devised by those skilled in the art and it is intended by the appended claims to cover all modifications and embodiments which will fall within the true spirit and scope of the present invention.

What is claimed as new and desired to be secured by Letters Patent of the United States is:

1. An end fitting for a rod comprising:
    an outer jacket having a cavity including a portion tapered toward one end;
    a longitudinally split wedge-shaped collet assembly defining a plurality of wedge fingers seated within said tapered portion, said assembly also defining a central bore for gripping engagement with the outer surface of said rod end, said bore having a wedge surface tapered outwardly opening toward the other end of said jacket opening; and
    a lock ring means having a central bore for gripping engagement with the outer surface of said end and having an outer wedge surface engaging the first mentioned wedge and formed of a ring having a substantially cylindrical central bore and whose outer wedge surface tapers less than the wedge surface of said collet assembly, said ring being forced against said collet assembly so that the wedge surfaces of each are in substantially interfacial engagement and so that the engaging end of said ring projects inwardly into said collet to define a projecting portion for locking engagement with said rod, said engaging end of said ring including an inner wedge surface tapering radially inwardly from the wedge surface of the collet to bear against said rod.

2. In combination an end fitting as defined in claim 1 including a rod extending through said central bores and having a circumferential depression near said one end, said projecting portion locking into said depression.

3. The combination of claim 2 wherein said rod is formed of glass fibers.

4. An end fitting for a rod comprising:
    an outer jacket having a cavity including a portion tapered toward one end;
    collet means seated within said tapered portion and also defining a central bore for gripping engagement with the outer surface of a rod end, said bore having a wedge surface tapered outwardly opening toward the other end of said jacket opening; and
    a lock ring means having a central bore for gripping engagement with the outer surface of said rod end and having an outer wedge surface at one end engaging the first mentioned wedge surface, and formed of a ring having a substantially cylindrical central bore and whose outer wedge surface tapers less than the wedge surface of said collet assembly, said ring being forced against said collet assembly so that the wedge surfaces of each are in substantial interfacial engagement, and including at said one end an inner wedge surface tapering radially inwardly from said wedge surface of said collet means for engagement against said rod.

5. An end fitting as set forth in claim 4 wherein the engaging end of said ring projects inwardly to define a projecting portion for locking engagement with a rod.

References Cited

UNITED STATES PATENTS

| | | | |
|---|---|---|---|
| 1,539,962 | 6/1925 | Seufert et al. | 287—114 XR |
| 1,646,660 | 10/1927 | Prince | 287—116 XR |
| 2,060,864 | 11/1936 | Hedler. | |
| 2,134,719 | 11/1938 | Kocher | 285—39 |
| 2,341,970 | 2/1944 | Worel. | |
| 2,859,056 | 11/1958 | Marks | 287—20.3 |
| 3,163,904 | 1/1965 | Ziolkowski | 287—114 XR |
| 3,428,338 | 2/1969 | Corwin | 285—39 |

FOREIGN PATENTS

| | | |
|---|---|---|
| 704,839 | 2/1931 | France. |
| 375,183 | 3/1964 | Switzerland. |

DAVID J. WILLIAMOWSKY, Primary Examiner

A. V. KUNDRAT, Assistant Examiner

U.S. Cl. X.R.

285—323